(12) United States Patent
Ng (10) Patent No.: US 7,802,819 B2
(45) Date of Patent: Sep. 28, 2010

(54) VEHICLE SEAT BELT GUIDING DEVICE

(75) Inventor: Cheong-Choon Ng, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 183 days.

(21) Appl. No.: 12/199,560

(22) Filed: Aug. 27, 2008

(65) Prior Publication Data

US 2010/0052404 A1 Mar. 4, 2010

(51) Int. Cl.
*B60R 22/00* (2006.01)

(52) U.S. Cl. ..................................... 280/808

(58) Field of Classification Search ............. 280/801.1, 280/808; 297/468, 483, 486
See application file for complete search history.

(56) References Cited

U.S. PATENT DOCUMENTS

| | | | |
|---|---|---|---|
| 4,607,864 A * | 8/1986 | Kouketsu et al. ............ | 280/808 |
| 5,037,135 A | 8/1991 | Kotikovsky et al. | |
| 5,385,370 A * | 1/1995 | Wickenheiser et al. ...... | 280/808 |
| 5,415,432 A | 5/1995 | Thomas | |
| 5,415,433 A | 5/1995 | Pfeiffer | |
| 5,918,903 A | 7/1999 | Ito | |
| 5,924,729 A | 7/1999 | Gleason et al. | |
| 6,439,609 B1 | 8/2002 | Smithson | |
| 6,739,625 B2 | 5/2004 | Tomita et al. | |
| 6,749,150 B2 | 6/2004 | Kohlndorfer et al. | |
| 7,380,833 B2 * | 6/2008 | Bronner et al. ............. | 280/808 |
| 2007/0138783 A1 | 6/2007 | Gleason et al. | |
| 2008/0030013 A1* | 2/2008 | Burghardt ................... | 280/808 |
| 2008/0054703 A1* | 3/2008 | Okazaki ..................... | 297/483 |

FOREIGN PATENT DOCUMENTS

JP H04-024147 1/1992

\* cited by examiner

*Primary Examiner*—Faye M. Fleming
(74) *Attorney, Agent, or Firm*—Global IP Counselors, LLP

(57) ABSTRACT

A vehicle seat belt guiding device is basically provided with a support portion and a seat belt guiding portion. The seat belt guiding portion includes a first seat belt guide surface extending for a prescribed length that is equal to or greater than a vehicle seat belt width, and a second guide portion includes a second seat belt guide surface extending for a prescribed length that is equal to or greater than half of the vehicle seat belt width. The second seat belt guide surface is angled upwardly with respect to the first seat belt guide surface to form a first acute angle and angled laterally with respect to the first seat belt guide surface to form a second acute angle, when the vehicle seat belt guiding device is in a seat belt in-use position.

20 Claims, 8 Drawing Sheets

VEHICLE SEAT BELT GUIDING DEVICE

BACKGROUND OF THE INVENTION

1. Field of the Invention

The present invention generally relates to a seat belt restraint system for restraining a seated occupant in the motor vehicle. More specifically, the present invention relates to a vehicle seat belt guiding device for guiding a shoulder belt portion of a seat belt restraint system.

2. Background Information

Most motor vehicles that are driven on a public road are required to have a seat belt restraint system for restraining a seated occupant. A variety of passive seat belt restraint systems have been proposed and put into practical use. Typically, a passive seat belt restraint system has seat belt webbing that restrains the seated occupant in both an area generally corresponding to the occupant's lap and an area generally corresponding to the occupant's torso. The seat belt webbing has a first end fixedly attached to the vehicle at a first point and a second end fixedly attached to the vehicle at a second point, with an intermediate portion of the seat belt webbing slidably attached to the vehicle at a third point by a D-ring.

Usually, the above mentioned seat belt restraint system has a retractor that is attached to one end of the seat belt webbing. The retractor includes a spool that receives the seat belt webbing for retraction or pay-out of seat belt webbing. The spool is used to wind up and store the seat belt webbing when the seat belt is not being used. Generally, the spool is also designed to payout the seat belt webbing until detection of an impact situation. In the case of an impact situation, the spool is locked to restrain the occupant via the seat belt.

Recently, retractors have also been designed to include a pretensioner, which is operatively coupled to the spool for taking up the seat belt webbing and eliminating slack when a potential impact situation is detected. In other words, the pretensioner of the retractor rapidly retracts the seat belt webbing onto the spool in response to a sensor detecting an impact situation to eliminate any slack in the seat belt, and thus, controls the physical space between the occupant and the seat belt webbing. In this manner, the occupant of the seat is pulled tightly into the seat before an impact situation arises in which the occupant moves forwardly relative to the seat. Also, retractors have been designed having one or more force limiting elements which are structured to allow the spool to rotate and payout the seat belt webbing upon reaching predetermined force levels between the occupant and seat belt. In this manner, the restraining force imposed on the occupant by the seat belt webbing can be limited in a controlled manner.

Typically, the D-ring is pivotally mounted so that the D-ring rotates from a seat belt stowed position to a seat belt in-use position. During a pretensioning situation (e.g., an impact situation) of the seat belt webbing, a force to the seat belt webbing tends to cause the D-ring to rotate downwardly. Once the D-ring stops rotating during a pretensioning, the seat belt webbing can slide along the guide slot of the D-ring such that bunching of the seat belt webbing can occur at one end of the guide slot of the D-ring. On the other hand, during payout situation of the seat belt webbing, a force from the seat belt webbing tends to cause the D-ring to rotate upwardly. Once the D-ring stops rotating during payout situation, the seat belt webbing can slide along the guide slot of the D-ring such that bunching of the seat belt webbing can occur at one end of the guide slot of the D-ring.

In view of the above, it will be apparent to those skilled in the art from this disclosure that there exists a need for an improved a vehicle seat belt guiding device. This invention addresses this need in the art as well as other needs, which will become apparent to those skilled in the art from this disclosure.

SUMMARY OF THE INVENTION

In view of the state of the known technology for seat belt guiding devices, one object of the present invention is to provide a vehicle seat belt guiding device that supports the seat belt webbing and reduces the bunching of the seat belt webbing during payout situation or pretensioning situation.

In accordance with one aspect of the present invention, a vehicle seat belt guiding device is basically provided with a support portion and a seat belt guiding portion. The seat belt guiding portion includes a first seat belt guide surface extending linearly for a prescribed length that is equal to or greater than a vehicle seat belt width, and a second seat belt guide surface extending linearly for a prescribed length that is equal to or greater than half of the vehicle seat belt width. The second seat belt guide surface is angled upwardly with respect to the first seat belt guide surface to form a first acute angle and angled laterally with respect to the first seat belt guide surface to form a second acute angle, when the vehicle seat belt guiding device is in a seat belt in-use position.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
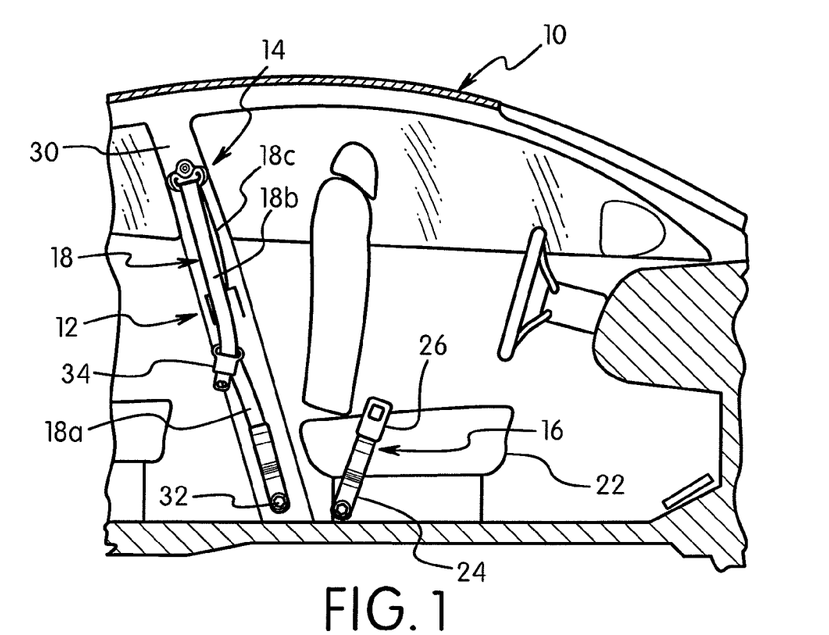
FIG. 1 is a partial side view of a vehicle having a seat belt restraint system (shown in the seat belt stowed position) that uses a vehicle seat belt guiding device in accordance with a first embodiment.
Figure 2:
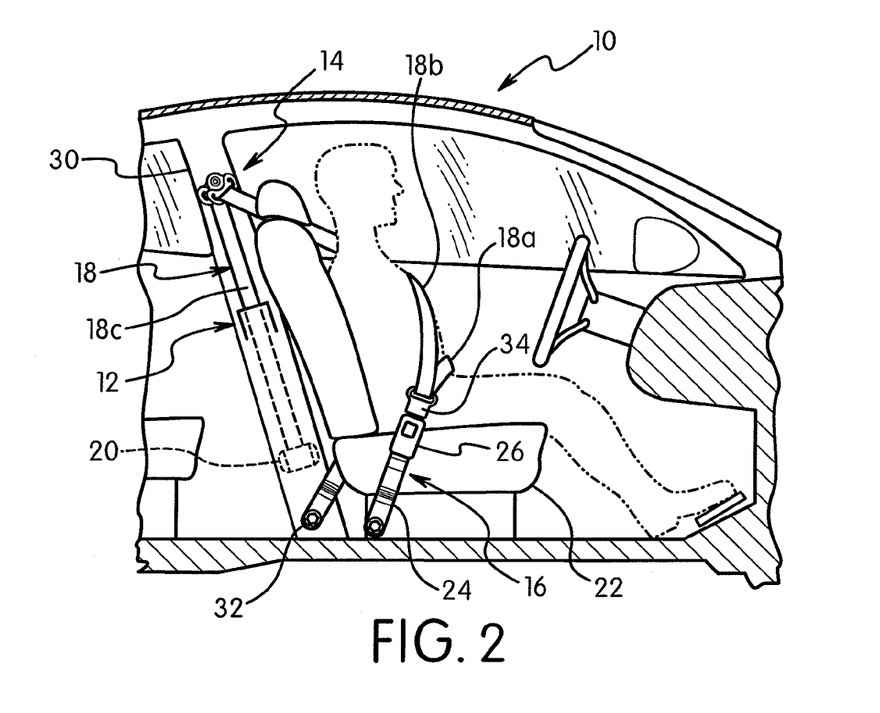
FIG. 2 is a partial side view of the vehicle illustrated in FIG. 1, but with the seat belt restraint system being shown in the seat belt in-use position in accordance with the first embodiment.

Referring initially to FIGS. 1 and 2, a portion of a vehicle 10 is illustrated with a seat belt restraint system 12 that uses a vehicle seat belt guiding device 14 in accordance with a first embodiment. Basically, in addition to the vehicle seat belt guiding device 14, the seat belt restraint system 12 includes a buckle assembly 16, a seat belt webbing 18 and a retractor 20 (see, FIG. 2).

The buckle assembly 16 is fixedly attached to a seat 22 of the vehicle 10, or a floor of the vehicle 10, at an inbound side of the seat 22. In the illustrated embodiment, the buckle assembly 16 has an attachment part 24 fixedly attached at one end to the seat 22. The other (free) end of the attachment part 24 is provided with a buckle part 26 attached thereto. The seat belt webbing 18 has a first end attached to the retractor 20 that is fixedly attached to a vehicle pillar 30, and a second end fixedly attached to the vehicle pillar 30 by an anchor 32.

A seat belt tongue part 34 is slidably attached to the seat belt webbing 18 to divide the seat belt webbing 18 into a lap section 18*a* and a torso section 18*b*. The seat belt tongue part 34 is engageable with the buckle part 26. The vehicle seat belt guiding device 14 slidably supports the seat belt webbing 18 and thus further divides the torso section 18*b* of the seat belt webbing 18 from a retractor connecting portion 18*c* of the seat belt webbing 18. Preferably, the retractor 20 is an emergency locking type belt retractor that includes a pretensioner (not shown) for retracting one end of the seat belt webbing 18 in the event of an emergency. The precise structure of the retractor 20 is not important to the vehicle seat belt guiding device 14. Thus, any type of retractor can be utilized with the seat belt restraint system 12.

Referring now to FIGS. 3 to 11, the vehicle seat belt guiding device 14 will be discussed in more detail. The vehicle seat belt guiding device 14 of this embodiment basically includes a first D-ring 40, a second D-ring 42, a spacer 44 and a mounting bolt 46. The mounting bolt 46 attaches the first and second D-rings 40 and 42 to the vehicle pillar 30, which is a B-pillar in the illustrated embodiment. The first D-ring 40 is stationary, while the second D-ring 42 is movable with respect to the first D-ring 40 about a pivot axis A within a prescribed range of motion. In the illustrated embodiment, the pivot axis A coincides with the longitudinal axis of the mounting bolt 46.

Figures 9, 10, 11:
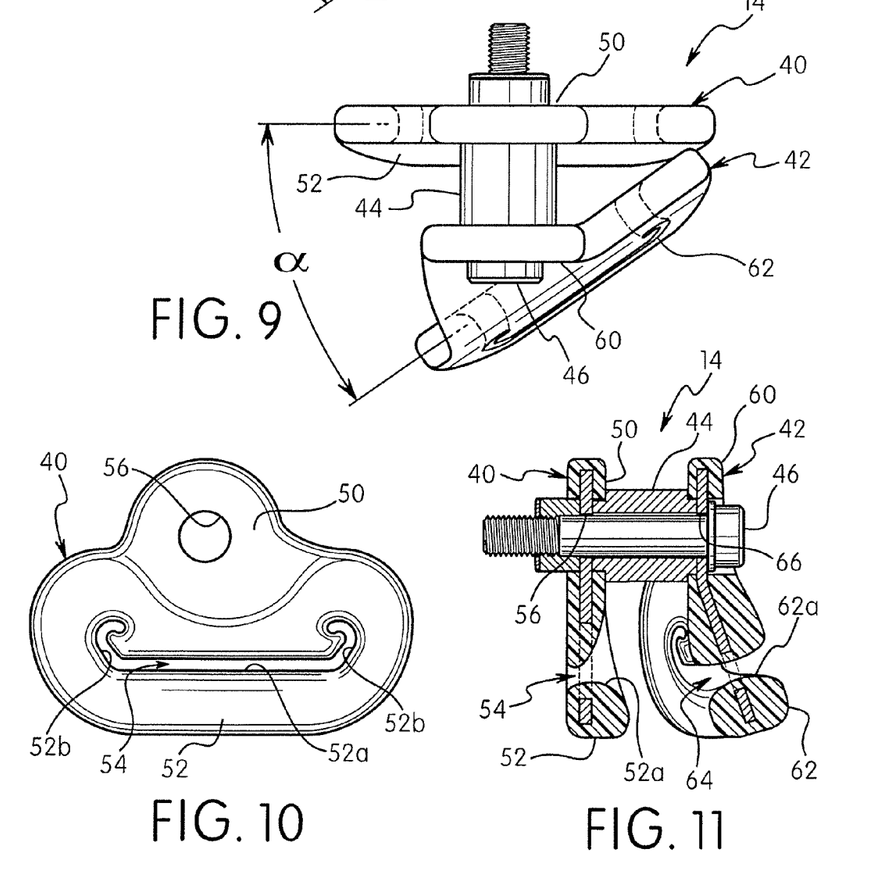
FIG. 9 is a top plan view of the vehicle seat belt guiding device in the seat belt in-use position in accordance with the first embodiment without the seat belt webbing.
FIG. 10 is a side elevational view of the first D-ring of the vehicle seat belt guiding device in accordance with the first embodiment.
FIG. 11 is a cross sectional view of the vehicle seat belt guiding device in the seat belt stowed position as seen along section line 11-11 of FIG. 3 in accordance with the first embodiment.

As best seen in FIG. 10, the first D-ring 40 basically includes a first support portion 50 and a first seat belt guiding portion 52 with a seat belt guide slot 54 formed between the first support portion 50 and the first guide portion 52. Preferably, as seen in FIG. 11, the first support portion 50 and the first seat belt guiding portion 52 are formed by a metal plate that is coated with a hard plastic material. The first support portion 50 has a hole 56 for receiving the mounting bolt 46 therethrough. The first seat belt guiding portion 52 includes a straight bar member having a first seat belt guide surface 52*a* that extends linearly for a prescribed length that is equal to or greater than a vehicle seat belt width. Thus, where the seat belt webbing 18 has a conventional or standard width of about two inches (1.8" to 1.9" to be more exact), the first guide surface 52*a* extends linearly for two inches or slightly more than two inches. At each of the ends of the first guide surface 52*a* is a curved surface 52*b*. Basically, the curved surfaces 52*b* also aid in providing an anti-bunching effect such as when the seat belt webbing 18 is pulled at a far angle or before the first D-ring 40 returns to the stowed position. The first D-ring 40 is basically a conventional D-ring that is commonly used for a vehicle seat belt.

Figure 3:
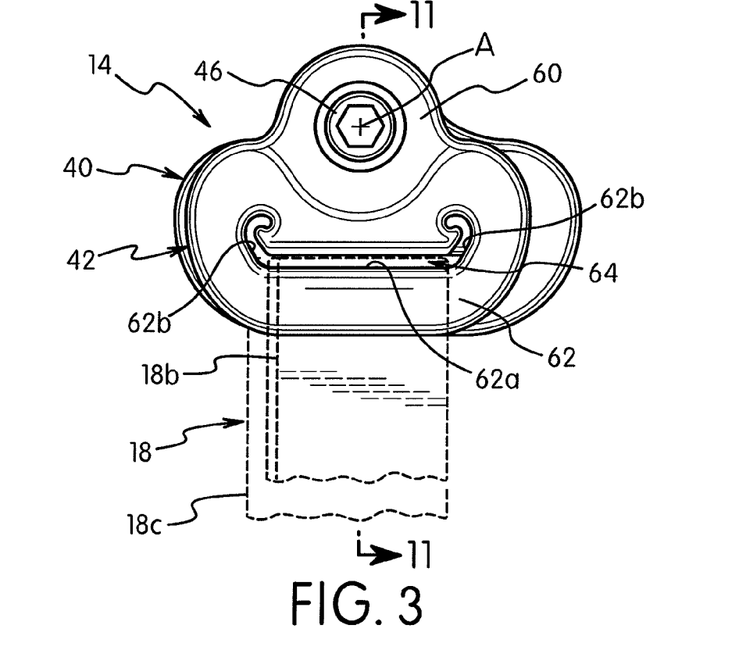
FIG. 3 is a side elevational view of the vehicle seat belt guiding device in the seat belt stowed position with the seat belt webbing supported thereon in accordance with the first embodiment.
Figure 4:
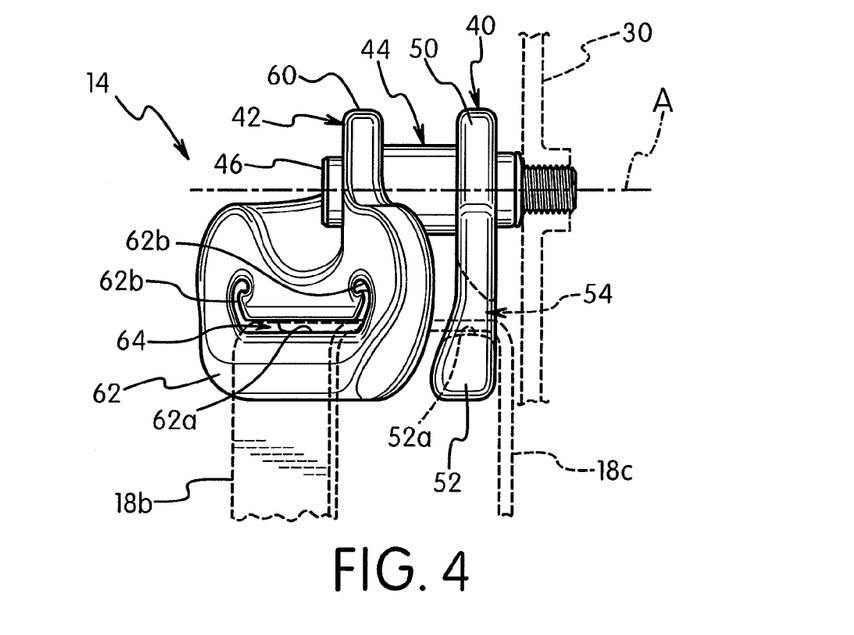
FIG. 4 is a front end elevational view of the vehicle seat belt guiding device in the seat belt stowed position with the seat belt webbing supported thereon in accordance with the first embodiment.
Figure 5:
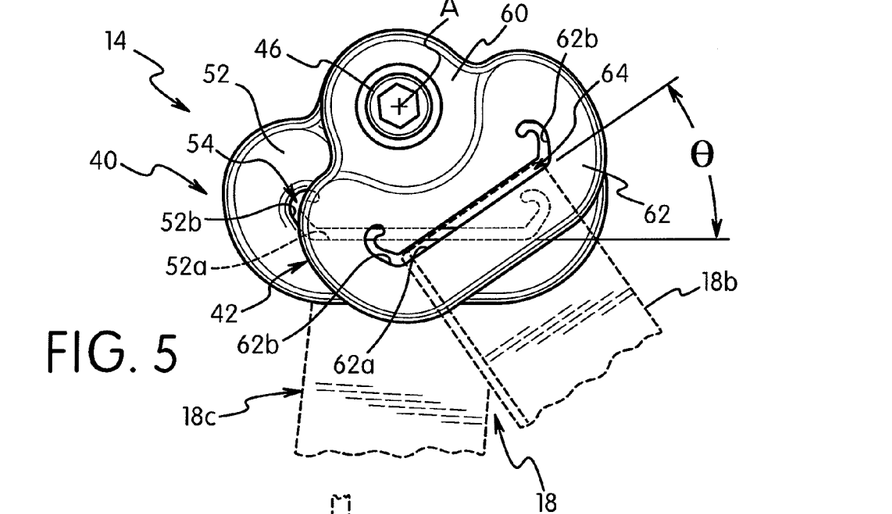
FIG. 5 is a side elevational view of the vehicle seat belt guiding device in the seat belt in-use position with the seat belt webbing supported thereon in accordance with the first embodiment.
Figure 6:
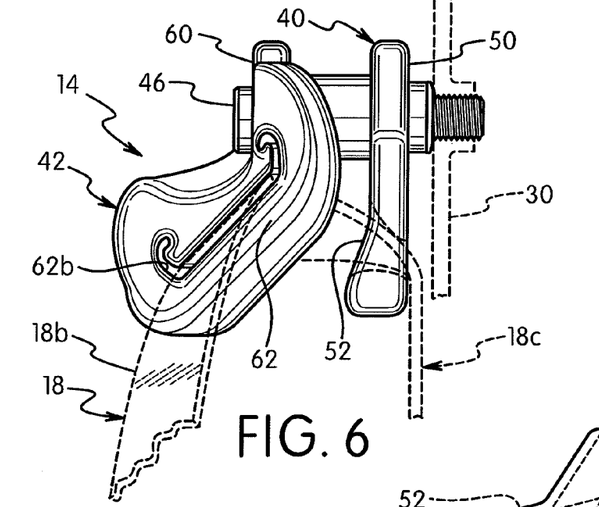
FIG. 6 is a front end elevational view of the vehicle seat belt guiding device in the seat belt in-use position with the seat belt webbing supported thereon in accordance with the first embodiment.
Figure 7:
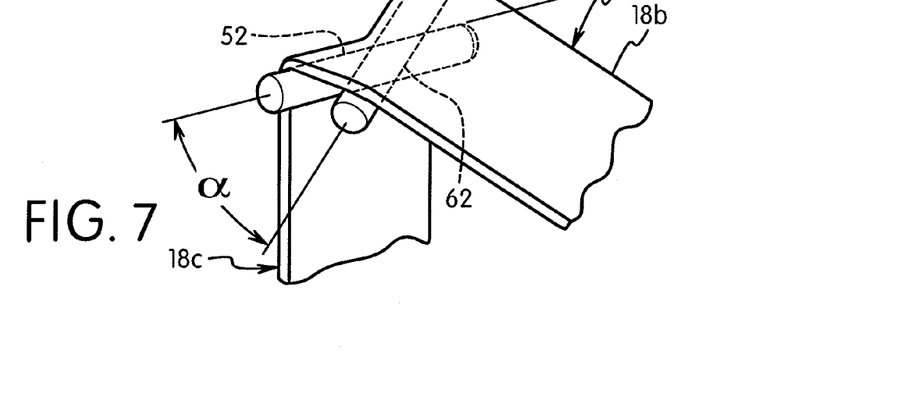
FIG. 7 is a diagrammatic perspective view of the vehicle seat belt guiding device in the seat belt in-use position with the seat belt webbing supported thereon in accordance with the first embodiment.
Figure 8:
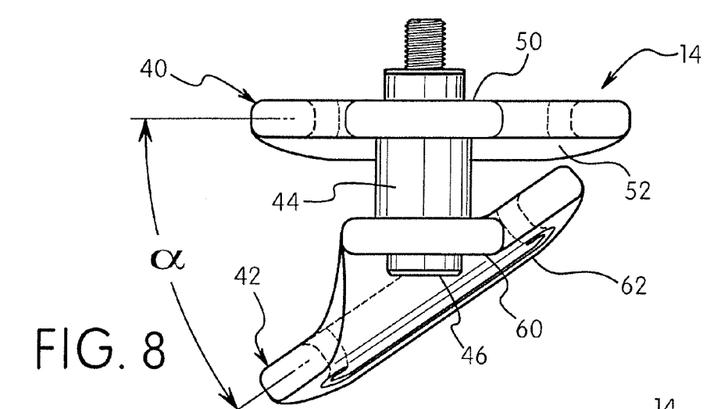
FIG. 8 is a top plan view of the vehicle seat belt guiding device in the seat belt stowed position in accordance with the first embodiment without the seat belt webbing.

As best seen in FIGS. 3 and 5, the second D-ring 42 basically includes a second support portion 60 and a second seat belt guiding portion 62 with a seat belt guide slot 64 formed between the second support portion 60 and the second guide portion 62. As seen in FIGS. 5 and 6, the second D-ring 42 pivots relative to the first D-ring 40 when the seat belt restraint system 12 is being used by an occupant of the vehicle 10. Thus, when the seat belt restraint system 12 is being used by an occupant of the vehicle 10, the second seat belt guiding portion 62 is angled upwardly and laterally with respect to the first seat belt guide surface 52a to provide an anti-bunching feature. Preferably, the first seat belt guiding portion 52 is perpendicular to the retractor connecting portion 18c of the seat belt webbing 18, while the second seat belt guiding portion 62 is perpendicular to the torso portion 18b of the seat belt webbing 18, when the seat belt restraint system 12 is being used by an occupant of the vehicle 10. With this arrangement, the sliding directions of the seat belt webbing 18 with respect to the first and second seat belt guiding portions 52 and 62 are maintained substantially perpendicular during both a pretensioning operation of the retractor 20 and a payout operation of the retractor 20.

Preferably, as seen in FIG. 11, the second support portion 60 and the second seat belt guiding portion 62 are formed by a metal plate that is coated with a hard plastic material. The second support portion 60 has a hole 66 for receiving the mounting bolt 46 therethrough as best seen in FIG. 11. The second seat belt guiding portion 62 includes a straight bar member having a second seat belt guide surface 62a that extends linearly for a prescribed length that is equal to or greater than a vehicle seat belt width. Thus, where the seat belt webbing 18 has a conventional or standard width of about two inches (1.8" to 1.9" to be more exact), the second seat belt guide surface 62a extends linearly for two inches or slightly more than two inches. At each of the ends of the second seat belt guide surface 62a is a curved surface 62b. Basically, the curved surfaces 62b also aid in providing an anti-bunching effect similar to the curved surfaces 52b of the first D-ring 40.

When the vehicle seat belt guiding device 14 is mounted to the vehicle pillar 30, the mounting bolt 46 passes through the holes 56 and 66 of the support portions 50 and 60 and fixed to the vehicle pillar 30 so that the first D-ring 40 is stationary and the second D-ring 42 is movable. The mounting bolt 46 and the support portions 50 and 60 constitute a mounting portion of the vehicle seat belt guiding device 14 for supporting the seat belt guiding portions 52 and 62. The seat belt guiding portions 52 and 62 constitute a seat belt guiding portion of the vehicle seat belt guiding device 14 for supporting the seat belt webbing 18.

As seen in FIGS. 5 and 6, when the vehicle seat belt guiding device 14 is in a seat belt in-use position, the second D-ring 42 is pivoted to an in-use position where the second seat belt guide surface 62a is angled upwardly with respect to the first seat belt guide surface 52a to form a first acute angle θ and angled laterally with respect to the first seat belt guide surface 52a to form a second acute angle α. When the vehicle seat belt guiding device 14 is in a seat belt stowed position, the second D-ring 42 is pivoted to the stowed position where the second seat belt guide surface 62a is preferably aligned with the first seat belt guide surface 52a as seen in a side elevational view (FIG. 3). In other words, the first acute angle θ becomes zero when the second D-ring 42 is in the stowed position.

The first and second acute angles θ and α can vary depending on the configuration and/or type of vehicle in which the vehicle seat belt guiding device 14 is being used with. Preferably, the first and second acute angles θ and α are in a range of 25 degrees to 45 degrees when the vehicle seat belt guiding device 14 is in the seat belt in-use position. In the case of a two door coupe type of vehicle, the first and second acute angles θ and α are more preferably in a range of 35 degrees to 45 degrees when the vehicle seat belt guiding device 14 is in a seat belt in-use position. In the case of a four door sedan type of vehicle, the first and second acute angles θ and α are more preferably in a range of 25 degrees to 35 degrees when the vehicle seat belt guiding device 14 is in a seat belt in-use position. Thus, in the case of a universal seat belt guiding device, the first and second acute angles θ and α can be set to 35 degrees when the vehicle seat belt guiding device 14 is in a seat belt in-use position.

Second Embodiment

Referring now to FIGS. 12 to 17, a vehicle seat belt guiding device 114 is illustrated in accordance with a second embodiment. The vehicle seat belt guiding device 114 replaces the vehicle seat belt guiding device 14 in the vehicle 10 of FIGS. 1 and 2. Thus, the vehicle seat belt guiding device 114 is attached to the vehicle pillar 30 with the seat belt webbing 18 slidably supported on the vehicle pillar 30 by the vehicle seat belt guiding device 114.

The vehicle seat belt guiding device 114 of this embodiment basically includes a first D-ring 140, a second D-ring 142, a spacer 144 and a mounting bolt 146. The mounting bolt 146 attaches the first and second D-rings 140 and 142 to the vehicle pillar 30. In this embodiment, both the first and second D-ring 140 and 142 are stationary with respect to the vehicle pillar 30. Thus, the first and second D-rings 140 and 142 do not move with respect to the vehicle pillar 30 during movement of the seat belt webbing 18.

The first D-ring 140 is identical to the first D-ring 40 of the first embodiment. The first D-ring 140 basically includes a first support portion 150 and a first seat belt guiding portion 152 with a seat belt guide slot 154 formed between the first support portion 150 and the first guide portion 152. The first support portion 150 has a hole 156 for receiving the mounting bolt 146 therethrough. The first seat belt guiding portion 152 includes a straight bar member having a first seat belt guide surface 152a that extends linearly for a prescribed length that is equal to or greater than a vehicle seat belt width. Thus, where the seat belt webbing 18 has a conventional or standard width of about two inches (1.8" to 1.9" to be more exact), the first seat belt guide surface 152a extends linearly for two inches or slightly more than two inches. At each of the ends of the first seat belt guide surface 152a is a curved surface 152b. The first D-ring 140 is basically a conventional D-ring that is commonly used for a vehicle seat belt.

Figure 12:
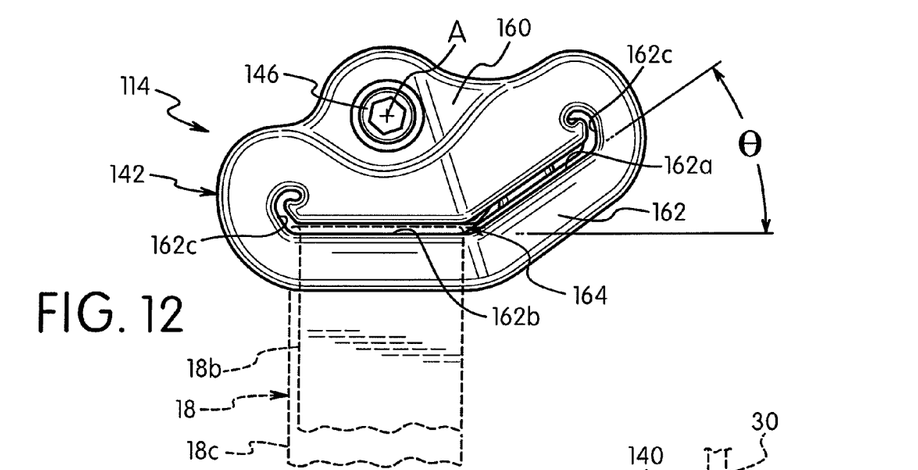
FIG. 12 is a side elevational view of the vehicle seat belt guiding device with the seat belt webbing supported thereon in the seat belt stowed position in accordance with a second embodiment.
Figure 13:
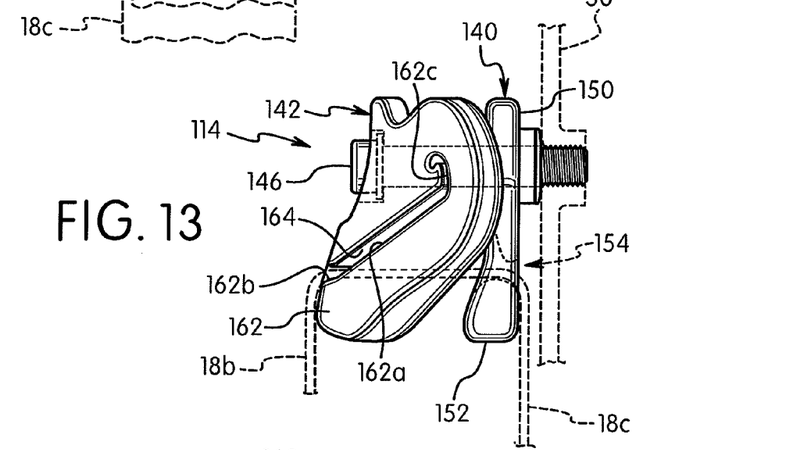
FIG. 13 is a front end elevational view of the vehicle seat belt guiding device with the seat belt webbing supported thereon in the seat belt stowed position in accordance with the second embodiment.

The second D-ring 142 basically includes a second support portion 160 and a second seat belt guiding portion 162 with a seat belt guide slot 164 formed between the second support portion 160 and the second guide portion 162. The second support portion 160 has a hole 166 for receiving the mounting bolt 146 therethrough. The second seat belt guiding portion 162 includes a bent bar member having a second seat belt guide surface 162a and a third seat belt guide surface 162b. The second seat belt guide surface 162a is angled upwardly and laterally with respect to the first and third seat belt guide surfaces 152a and 162b to provide an anti-bunching feature. The third seat belt guide surface 162b is preferably aligned with and parallel to the first seat belt guide surface 152a as viewed in a side elevational (FIG. 12). At each of the opposite ends of the second and third seat belt guide surfaces 162a and 162b is a curved surface 162c. Thus, the bent bar member having the second and third seat belt guide surfaces 162a and 162b and the straight bar member having the first seat belt guide surface 152a are separate elements disposed in a side by side relationship with respect to each other.

Each of the second and third seat belt guide surfaces 162a and 162b extends linearly for a prescribed length that is equal to or greater than a vehicle seat belt width such that in the seat belt in-use position, the seat belt webbing 18 is completely supported on the first and second seat belt guide surfaces 152a and 162a and does not contact the third seat belt guide surface 162b. Also when in the seat belt stowed position, seat belt webbing 18 is completely supported on the first and third seat belt guide surfaces 152a and 162b and does not contact the second seat belt guide surface 162a. Thus, where the seat belt webbing 18 has a conventional or standard width of about two inches (1.8" to 1.9" to be more exact), each of the second and third seat belt guide surfaces 162a and 162b extends linearly for two inches or slightly more than two inches. However, since the second and third seat belt guide surfaces 162a and 162b are contiguous, one or both of the second and third seat belt guide surfaces 162a and 162b could be made smaller than the width of a conventional or standard seat belt webbing. Preferably, the second seat belt guide surface 162a extends linearly for a prescribed length that is at least equal to or greater than half of the conventional or standard vehicle seat belt width.

Figure 14:
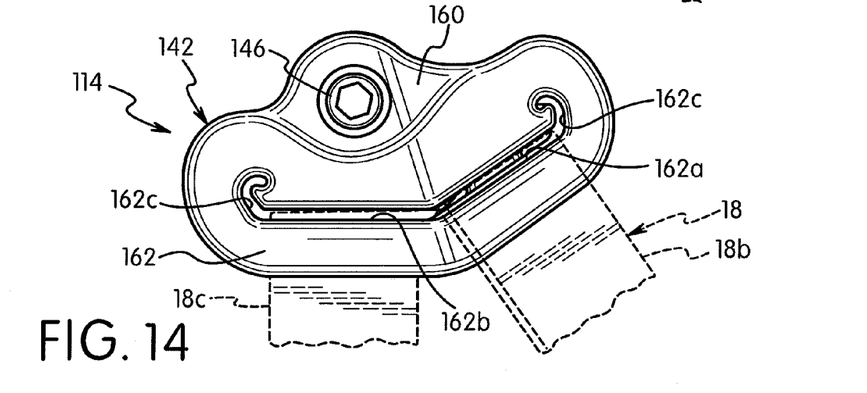
FIG. 14 is a side elevational view of the vehicle seat belt guiding device with the seat belt webbing supported thereon in the seat belt in-use position in accordance with the second embodiment.
Figure 15:
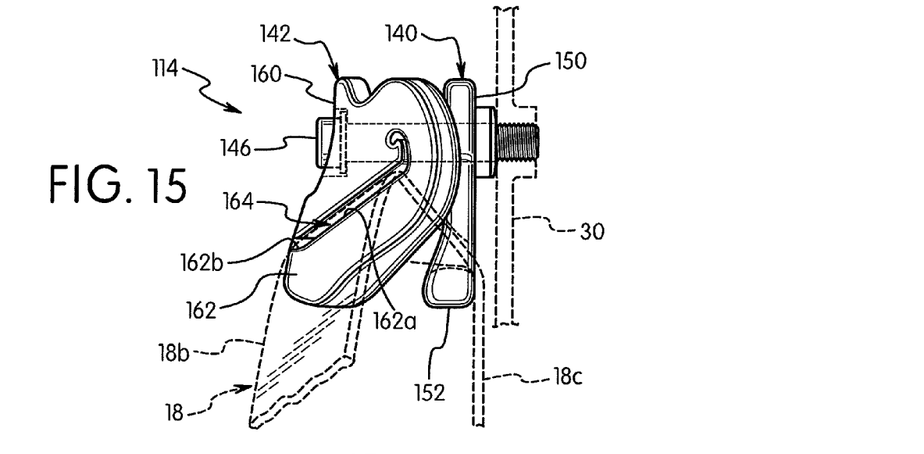
FIG. 15 is a front end elevational view of the vehicle seat belt guiding device with the seat belt webbing supported thereon in the seat belt in-use position in accordance with the second embodiment.
Figure 16:
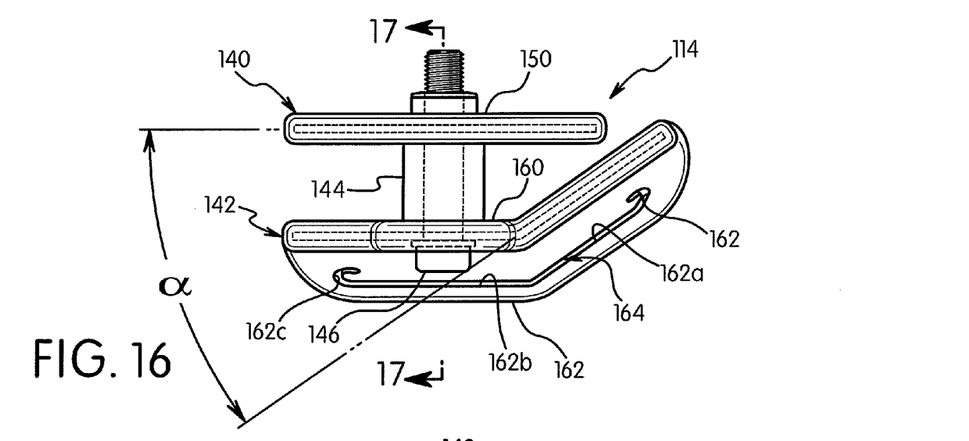
FIG. 16 is a top plan view of the vehicle seat belt guiding device in the seat belt stowed position in accordance with the second embodiment without the seat belt webbing.
Figure 17:
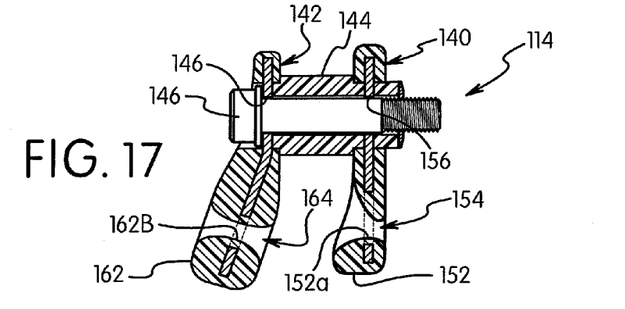
FIG. 17 is a cross sectional view of the vehicle seat belt guiding device in the seat belt stowed position as seen along section line 17-17 of FIG. 16.
Figures 18, 19, 20, 21:
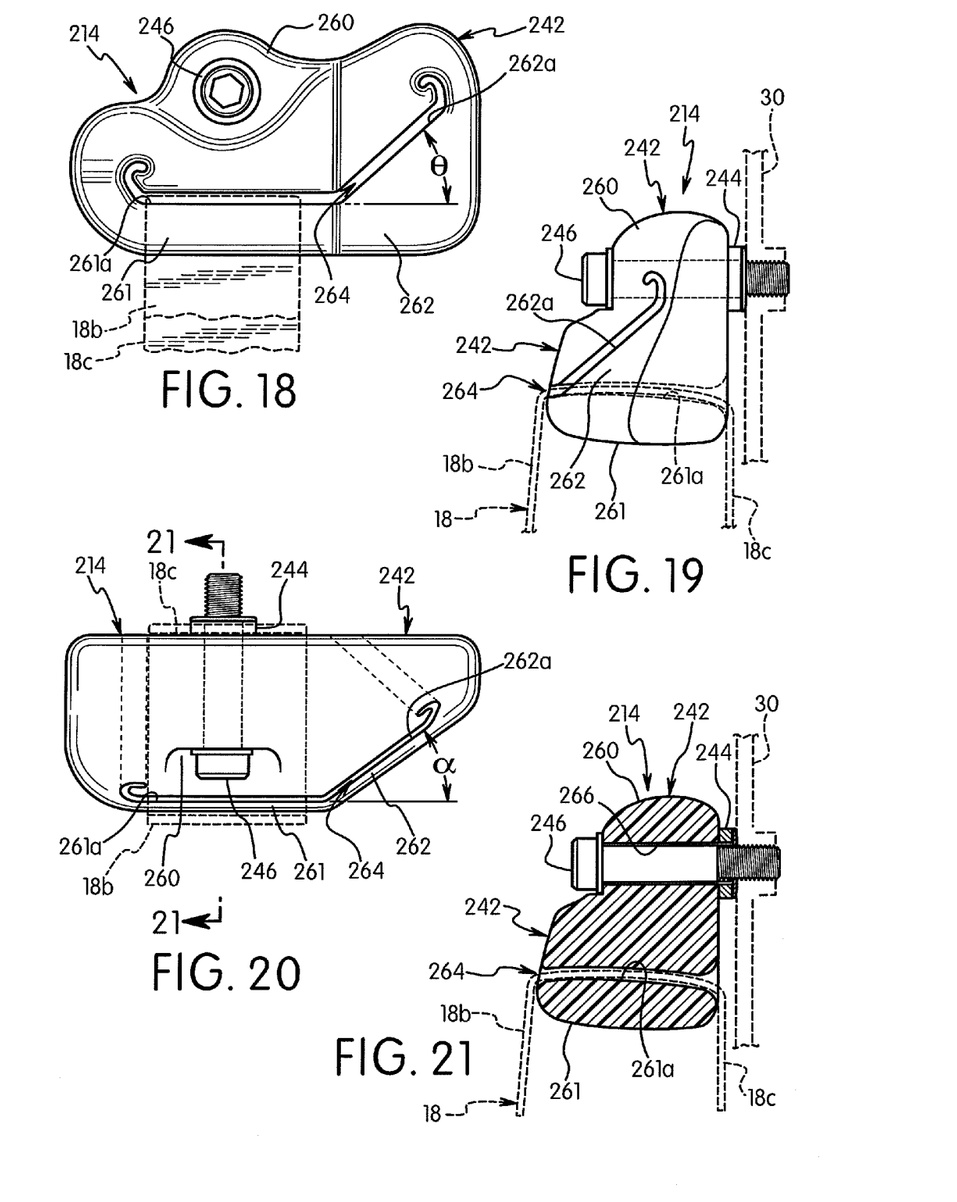
FIG. 18 is a side elevational view of the vehicle seat belt guiding device in the seat belt stowed position with the seat belt webbing supported thereon in accordance with a third embodiment.
FIG. 19 is a front end elevational view of the vehicle seat belt guiding device in the seat belt stowed position with the seat belt webbing supported thereon in accordance with the third embodiment.
FIG. 20 is a top plan view of the vehicle seat belt guiding device in the seat belt stowed position in accordance with the third embodiment.
FIG. 21 is a cross sectional view of the vehicle seat belt guiding device as seen along section line 21-21 of FIG. 20 in accordance with the third embodiment.
Figures 22, 23, 24, 25:
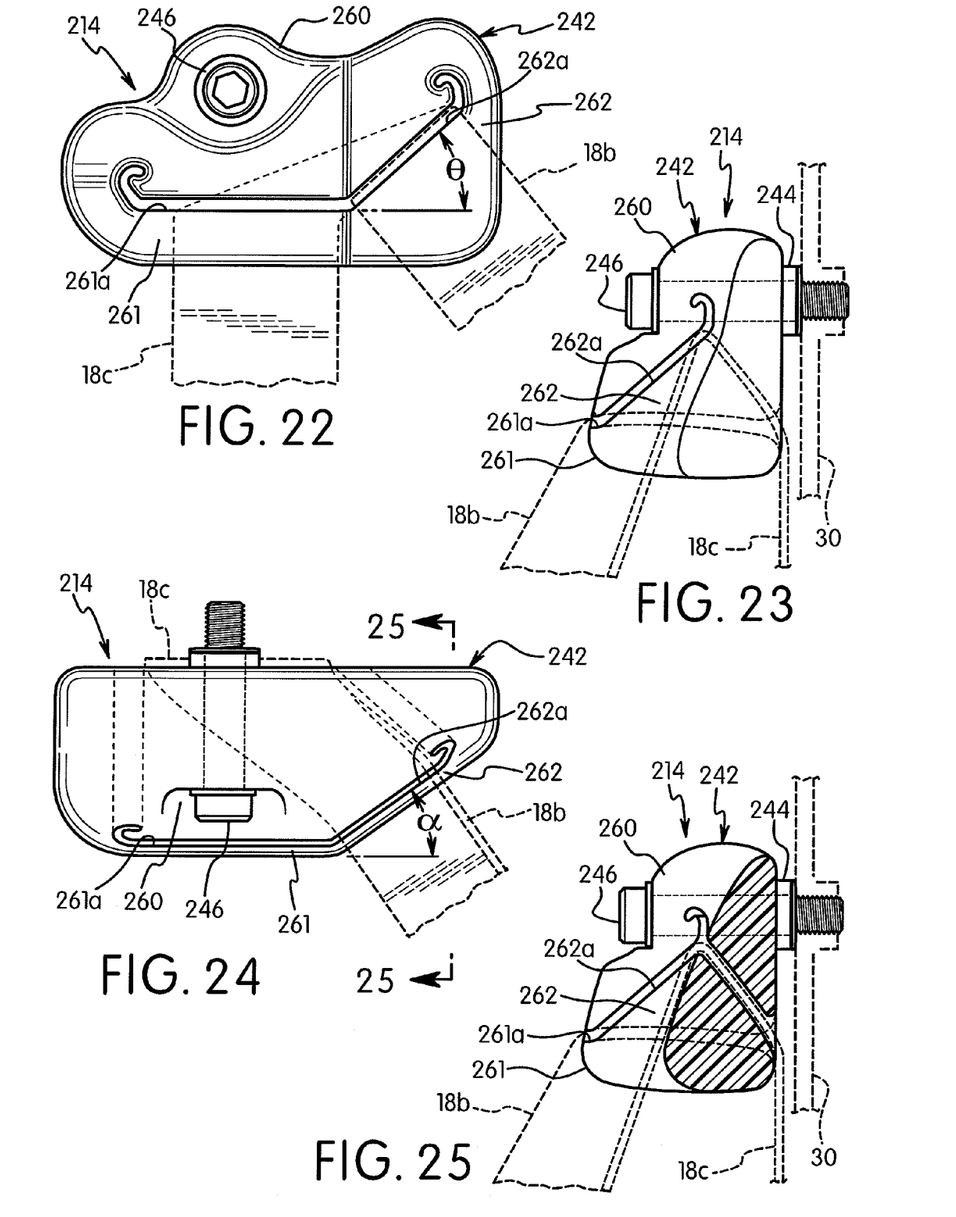
FIG. 22 is a side elevational view of the vehicle seat belt guiding device in the seat belt in-use position with the seat belt webbing supported thereon in accordance with the third embodiment.
FIG. 23 is a front end elevational view of the vehicle seat belt guiding device in the seat belt in-use position with the seat belt webbing supported thereon in accordance with the third embodiment.
FIG. 24 is a top plan view of the vehicle seat belt guiding device in the seat belt in-use position in accordance with the third embodiment.
FIG. 25 is a cross sectional view of the vehicle seat belt guiding device in the as seen along section line 25-25 of FIG. 24 in accordance with the third embodiment.

Thus, with vehicle seat belt guiding device 114, when the seat belt restraint system is being used by an occupant of the vehicle 10, the second seat belt guide surface 162a is angled upwardly and laterally with respect to the first seat belt guide surface 152a to provide an anti-bunching feature. Preferably, the first seat belt guiding portion 152 is perpendicular to the retractor connecting portion 18c of the seat belt webbing 18, while the second seat belt guide surface 162a is perpendicular to the torso portion 18b of the seat belt webbing 18, when the seat belt restraint system is being used by an occupant of the vehicle 10. With this arrangement, the sliding directions of the seat belt webbing 18 with respect to the first and second seat belt guide surfaces 152a and 162a are maintained substantially perpendicular during both a pretensioning operation of the retractor 20 and a payout operation of the retractor 20. When the seat belt webbing 18 is released to be stowed, the seat belt webbing 18 slides from the second seat belt guide surface 162a to the third seat belt guide surface 162b. Thus, the seat belt webbing 18 moves out of the way to a generally vertical position.

The mounting bolt 146 and the support portions 150 and 160 constitute a mounting portion of the vehicle seat belt guiding device 114 for supporting the seat belt guiding portions 152 and 162. The seat belt guiding portions 152 and 162 constitute a seat belt guiding portion of the vehicle seat belt guiding device 114 for supporting the seat belt webbing 18.

Third Embodiment

Referring now to FIGS. 18 to 25, a vehicle seat belt guiding device 214 is illustrated in accordance with a third embodiment. The vehicle seat belt guiding device 214 replaces the vehicle seat belt guiding device 14 in the vehicle 10 of FIGS. 1 and 2. Thus, the vehicle seat belt guiding device 214 is attached to the vehicle pillar 30 with the seat belt webbing 18 slidably supported on the vehicle pillar 30 by the vehicle seat belt guiding device 214.

In this embodiment, the belt guiding device 214 basically includes a single D-ring 242, a spacer 244 and a mounting bolt 246. The mounting bolt 246 attaches the D-ring 242 to the vehicle pillar 30. In this embodiment, the D-ring 242 is stationary with respect to the vehicle pillar 30. Thus, the D-ring 242 does not move with respect to the vehicle pillar 30 during movement of the seat belt webbing 18.

The D-ring 242 basically includes a support portion 260, a first seat belt guiding portion 261 and a second seat belt guiding portion 262 with a seat belt guide slot 264 formed between the support portion 260 and the first and second guide portions 261 and 262. The support portion 260 has a hole 266 for receiving the mounting bolt 246 therethrough. The first and second guide portions 261 and 262 form a bent bar member with the first seat belt guiding portion 261 including a first seat belt guide surface 161a and the second seat belt guiding portion 262 including a second seat belt guide surface 262a. Thus, in this embodiment, the first and second seat belt guiding portions 261 and 262 are part of a single bent bar member such that the first and second guide surfaces 261a and 262 are contiguous.

The first seat belt guide surface 261a extends linearly for a first prescribed length that is equal to or greater than a vehicle seat belt width at the inbound facing side of the seat belt guide slot 264, while the second seat belt guide surface 262a extends linearly for a second prescribed length that is equal to or greater than the vehicle seat belt width the inbound facing side of the seat belt guide slot 264. However, the second seat belt guide surface 262a is narrower at the outbound facing side of the seat belt guide slot 264. The second seat belt guide surface 262a is angled laterally and upwardly to form a first acute angle $\theta$ with respect to the first seat belt guide surface 261a and a second acute angle $\alpha$ with respect to the first seat belt guide surface 261a.

With this arrangement, the sliding directions of the seat belt webbing 18 with respect to the first and second seat belt guide surfaces 261a and 262a are maintained substantially perpendicular during both a pretensioning operation of the retractor 20 and a payout operation of the retractor 20. When the seat belt webbing 18 is released to be stowed, the seat belt webbing 18 slides from the second seat belt guide surface 262a to the first seat belt guide surface 261a. Thus, the general function of the belt guiding device 214 is the same as the prior embodiments, i.e., preventing bunching during of the seat belt webbing 18 during a pretensioning situation or a payout situation. In view of these similarities, between the belt guiding device 214 and the prior embodiments, the belt guiding device 214 will not be discussed in further detail.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with a vehicle seat belt guiding device such as disclosed herein. Accordingly, these terms, as utilized to describe the present invention should be interpreted relative to a vehicle equipped with a vehicle seat belt guiding device such as disclosed herein. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle seat belt guiding device comprising:
    a mounting portion; and
    a seat belt guiding portion including a first seat belt guide surface extending for a prescribed length that is equal to or greater than a vehicle seat belt width, and a second guide portion including a second seat belt guide surface extending linearly for a prescribed length that is equal to or greater than half of the vehicle seat belt width,
    the second seat belt guide surface being angled upwardly with respect to the first seat belt guide surface to form a first acute angle and angled laterally with respect to the first seat belt guide surface to form a second acute angle, when the vehicle seat belt guiding device is in a seat belt in-use position.

2. The vehicle seat belt guiding device according to claim 1, wherein
    the first acute angle between the first and second seat belt guide surfaces is in a range of 25 degrees to 45 degrees when the vehicle seat belt guiding device is in a seat belt in-use position.

3. The vehicle seat belt guiding device according to claim 1, wherein
    the first acute angle between the first and second seat belt guide surfaces is in a range of 35 degrees to 45 degrees when the vehicle seat belt guiding device is in a seat belt in-use position.

4. The vehicle seat belt guiding device according to claim 1, wherein
    the first acute angle between the first and second seat belt guide surfaces is in a range of 25 degrees to 35 degrees when the vehicle seat belt guiding device is in a seat belt in-use position.

5. The vehicle seat belt guiding device according to claim 1, wherein
    the first acute angle between the first and second seat belt guide surfaces is 35 degrees when the vehicle seat belt guiding device is in a seat belt in-use position.

6. The vehicle seat belt guiding device according to claim 1, wherein
    the second acute angle between the first and second seat belt guide surfaces is in a range of 25 degrees to 45 degrees when the vehicle seat belt guiding device is in a seat belt in-use position.

7. The vehicle seat belt guiding device according to claim 1, wherein
    the second acute angle between the first and second seat belt guide surfaces is in a range of 35 degrees to 45 degrees when the vehicle seat belt guiding device is in a seat belt in-use position.

8. The vehicle seat belt guiding device according to claim 1, wherein
    the second acute angle between the first and second seat belt guide surfaces is in a range of 25 degrees to 35 degrees when the vehicle seat belt guiding device is in a seat belt in-use position.

9. The vehicle seat belt guiding device according to claim 1, wherein
    the second acute angle between the first and second seat belt guide surfaces is 35 degrees when the vehicle seat belt guiding device is in a seat belt in-use position.

10. The vehicle seat belt guiding device according to claim 2, wherein
    the second acute angle between the first and second seat belt guide surfaces is in a range of 25 degrees to 45 degrees when the vehicle seat belt guiding device is in a seat belt in-use position.

11. The vehicle seat belt guiding device according to claim 1, wherein
    the mounting portion and the seat belt guiding portion are formed by a first D-ring and a second D-ring, the first D-ring including a first support part of the mounting portion and the first seat belt guide surface of the seat belt guiding portion, and the second D-ring including a second support part of the mounting portion and the second seat belt guide surface of the seat belt guiding portion.

12. The vehicle seat belt guiding device according to claim 11, wherein
    the second D-ring is movable with respect to the first D-ring within a prescribed range of motion such that the second seat belt guide surface is angled upwardly with respect to the first seat belt guide surface when the vehicle seat belt guiding device is in a seat belt in-use position and the second seat belt guide surface is parallel with respect to the first seat belt guide surface when the vehicle seat belt guiding device is in a seat belt stow position.

13. The vehicle seat belt guiding device according to claim 12, wherein
    the first D-ring includes a straight bar member having the first seat belt guide surface; and
    the second D-ring includes a straight bar member having the second seat belt guide surface.

14. A vehicle seat belt guiding device comprising:
    a mounting portion; and
    a seat belt guiding portion including a first seat belt guide surface extending for a prescribed length that is equal to or greater than a vehicle seat belt width, and a second guide portion including a second seat belt guide surface extending linearly for a prescribed length that is equal to or greater than half of the vehicle seat belt width,
    the second seat belt guide surface being angled upwardly with respect to the first seat belt guide surface to form a first acute angle and angled laterally with respect to the first seat belt guide surface to form a second acute angle, when the vehicle seat belt guiding device is in a seat belt in-use position, wherein the guide portion includes a third seat belt guide surface extending for a third prescribed length with the third seat belt guide surface being parallel to the first seat belt guide surface at least when in a seat belt in-use position.

15. The vehicle seat belt guiding device according to claim 14, wherein the mounting portion and the seat belt guiding portion are formed by a first D-ring and a second D-ring, the first D-ring including a first support part of the mounting portion and the first seat belt guide surface of the seat belt guiding portion, and the second D-ring including a second support part of the mounting portion and the second and third seat belt guide surfaces of the seat belt guiding portion.

16. The vehicle seat belt guiding device according to claim 15, wherein the first D-ring includes a straight bar member having the first seat belt guide surface with the first bar member being disposed at a first position; and the second D-ring includes a bent bar member having the second and third seat belt guide surfaces, the bent bar member being fixed at a second position such that the straight bar member and the bent bar member are separate elements with the first and third seat belt guide surfaces disposed in a side by side relationship with respect to each other.

17. A vehicle seat belt guiding device comprising:

a mounting portion; and a seat belt guiding portion including a first seat belt guide surface extending for a prescribed length that is equal to or greater than a vehicle seat belt width, and a second guide portion including a second seat belt guide surface extending linearly for a prescribed length that is equal to or greater than half of the vehicle seat belt width, the second seat belt guide surface being angled upwardly with respect to the first seat belt guide surface to form a first acute angle and angled laterally with respect to the first seat belt guide surface to form a second acute angle, when the vehicle seat belt guiding device is in a seat belt in-use position, wherein the first and second guide surfaces are part of a single bar member such that the first and second guide surfaces are contiguous.

18. The vehicle seat belt guiding device according to claim 1, wherein the first and second seat belt guide surfaces are arranged such that when the vehicle seat belt guiding device is in a seat belt in-use position, the first and second seat belt guide surfaces are positioned to guide a single seatbelt having the vehicle seat belt width, such that the first seat belt guide surface is positioned to guide the single seatbelt toward the second seat belt guide surface which is positioned to further guide the single seatbelt that is being guided by the first seat belt guide surface.

19. The vehicle seat belt guiding device according to claim 1, wherein the prescribed length of the second seat belt guide surface extends between a first end of the second seat belt guide surface and a second end of the second seat belt guide surface; and the second seat belt guide surface is angled laterally with respect to the first seat belt guide surface such that the first end is at a first distance from the first seat belt guide taken in a direction extending parallel to the first seat belt guide surface and perpendicularly toward a plane that extends perpendicularly through the second seat belt guide surface, and the second end is at a second distance from the first seat belt guide surface taken in the direction toward the plane, with the second distance being greater than the first distance, so that the second seat belt guide surface extends outwardly and away from the first seat belt guide surface.

20. The vehicle seat belt guiding device according to claim 19, wherein the first and second seat belt guide surfaces are arranged such that when the vehicle seat belt guiding device is in a seat belt in-use position, the first and second seat belt guide surfaces are positioned to guide a single seatbelt having the vehicle seat belt width, such that the first seat belt guide surface is positioned to guide the single seatbelt toward the second seat belt guide surface which is positioned to further guide the single seatbelt that is being guided by the first seat belt guide surface, such that a length of the single seatbelt that extends between the second end of the second seat belt guide surface and the first seat belt guide surface is longer than a length of the single seatbelt that extends between the first end of the second seat belt guide surface and the first seat belt guide surface.

* * * * *